United States Patent [19]
Daly et al.

[11] Patent Number: 5,819,005
[45] Date of Patent: Oct. 6, 1998

[54] MODULAR DIGITAL RECORDING LOGGER

[75] Inventors: Daniel F. Daly, Monroe; John Henits, Bethel; Salvatore J. Morlando, Easton; Robert B. Swick, Stratford; Keith K W Leung, Monroe; Constantine P. Messologitis, Milford, all of Conn.

[73] Assignee: Dictaphone Corporation, Stratford, Conn.

[21] Appl. No.: 623,671

[22] Filed: Mar. 29, 1996

Related U.S. Application Data

[63] Continuation of Ser. No. 100,944, Aug. 3, 1993, abandoned.

[51] Int. Cl.⁶ .................. G10L 3/02; G11B 5/09
[52] U.S. Cl. .......... 395/2.09; 395/2.79; 395/2.91; 360/48; 379/88
[58] Field of Search .............. 370/58.2, 62, 84, 370/235, 280; 381/36; 395/2, 2.79, 2.81, 2.87, 2.09, 2.91, 2.94; 360/48, 5, 32; 379/68, 70, 73, 75, 85, 88

[56] References Cited

U.S. PATENT DOCUMENTS

| | | | |
|---|---|---|---|
| 4,260,854 | 4/1981 | Kolodny et al. | 360/71 |
| 4,375,083 | 2/1983 | Maxemchuk | 364/900 |
| 4,621,357 | 11/1986 | Naiman et al. | 370/58.2 |
| 4,630,261 | 12/1986 | Irvin | 370/235 |
| 4,679,191 | 7/1987 | Nelson et al. | 370/84 |
| 4,829,514 | 5/1989 | Frimmel et al. | 370/58 |
| 5,001,703 | 3/1991 | Johnson et al. | 370/280 |
| 5,121,212 | 6/1992 | Okumura et al. | 348/738 |
| 5,129,036 | 7/1992 | Dean et al. | 395/2 |
| 5,142,527 | 8/1992 | Barbier et al. | 370/62 |
| 5,353,168 | 10/1994 | Crick | 360/5 |
| 5,448,420 | 9/1995 | Henits et al. | 360/48 |
| 5,511,000 | 4/1996 | Kaloi et al. | 364/514 A |

FOREIGN PATENT DOCUMENTS

| | | | |
|---|---|---|---|
| 4005027 | 2/1992 | Germany | H04M 11/06 |
| 2174330 | 7/1990 | Japan | H04L 12/18 |
| 1712964 | 2/1992 | U.S.S.R. | G11C 11/40 |

OTHER PUBLICATIONS

Brochure—VR240 Digital Broadcast Logger (no date).

*Primary Examiner*—Allen R. MacDonald
*Assistant Examiner*—Richemond Dorvil
*Attorney, Agent, or Firm*—Curtis, Morris & Safford, P.C.; Gregor N. Neff

[57] ABSTRACT

A modular digital recording system that records audio on digital audio tapes provides redundancy and the ability to record audio while listening to portions of audio that had been recorded on the DAT. The system uses a hard disc that receives audio for recording simultaneously with the DAT. When one wishes to listen to a voice message, one can activate the hard disc to listen to a particular message while the DAT is still recording. The system is modular so that the capacity can be expanded as required. The system includes a LAN adapter so that the system can provide networking access.

26 Claims, 3 Drawing Sheets

MODULAR DIGITAL RECORDING LOGGER

This is a continuation of U.S. patent application Ser. No. 08/100,944, filed Aug. 3, 1993 now abandoned.

BACKGROUND OF THE INVENTION

In the field of voice processing, there are circumstances in which it is necessary that audio, such as conversations, be recorded and the time when such recordings took place be established. Systems capable of providing this requirement have been commercially available for a long period and are referred to as recording loggers, or loggers for short. Prior systems have worked rather well, but were based for a long time on analog technology. Because of this, the prior logger systems were physically large and the tapes that recorded audio for archival purposes were also large, thus requiring a large amount of storage space.

To overcome these drawbacks of prior analog loggers, digital loggers have recently been developed and offered commercially. Although such digital loggers have advantages over the prior analog loggers, they still have shortcomings in terms of networking expandability and voice capacity. It is an object of the invention to provide a digital logger that overcomes these disadvantages. In addition,it is an object of the invention to provide a digital logger that is modular in construction so that the capacity of such logger can be increased conveniently and economically and software can be upgraded as required.

SUMMARY OF THE INVENTION

The modular digital recording logger of the invention provides advantages not only over prior analog loggers, but over prior digital recording loggers as well. The digital logger of this invention has a basic unit that comprises four primary components, an audio card that monitors audio sources (such as telephones), a main card that processes audio, a host computer that controls the overall operation and memory.

The audio card serves the main functions of communicating with the audio sources, converting received analog signals to digital signals and directing the audio signals through a time division multiplexed (TDM) bus to the main, or application card.

The application card communicates with the audio card through the TDM bus to monitor the status of the audio cards, when there is more than one, and determine which needs service. The application card packages received data, executes speech compression and expansion, performs VOX and performs other functions. The application card is attached to an ISA bus as are a computer, such as a personal computer, a LAN adapter and a SCSI adaptor. The computer stores the operating instructions and supervises and coordinates the activities of the other components of the logger system. The SCSI adaptor is in communication with at least one digital audio tape (DAT) drive and at least one hard disc drive. The system is modular so that the capacity of the system can be expanded as required readily at a minimum cost and software can be modified conveniently as desired. In addition, the LAN adapter allows each logger of the invention to be part of a networked system that include other digital loggers and workstations.

DETAILED DESCRIPTION OF THE PREFERRED EMBODIMENT

Figure 1:
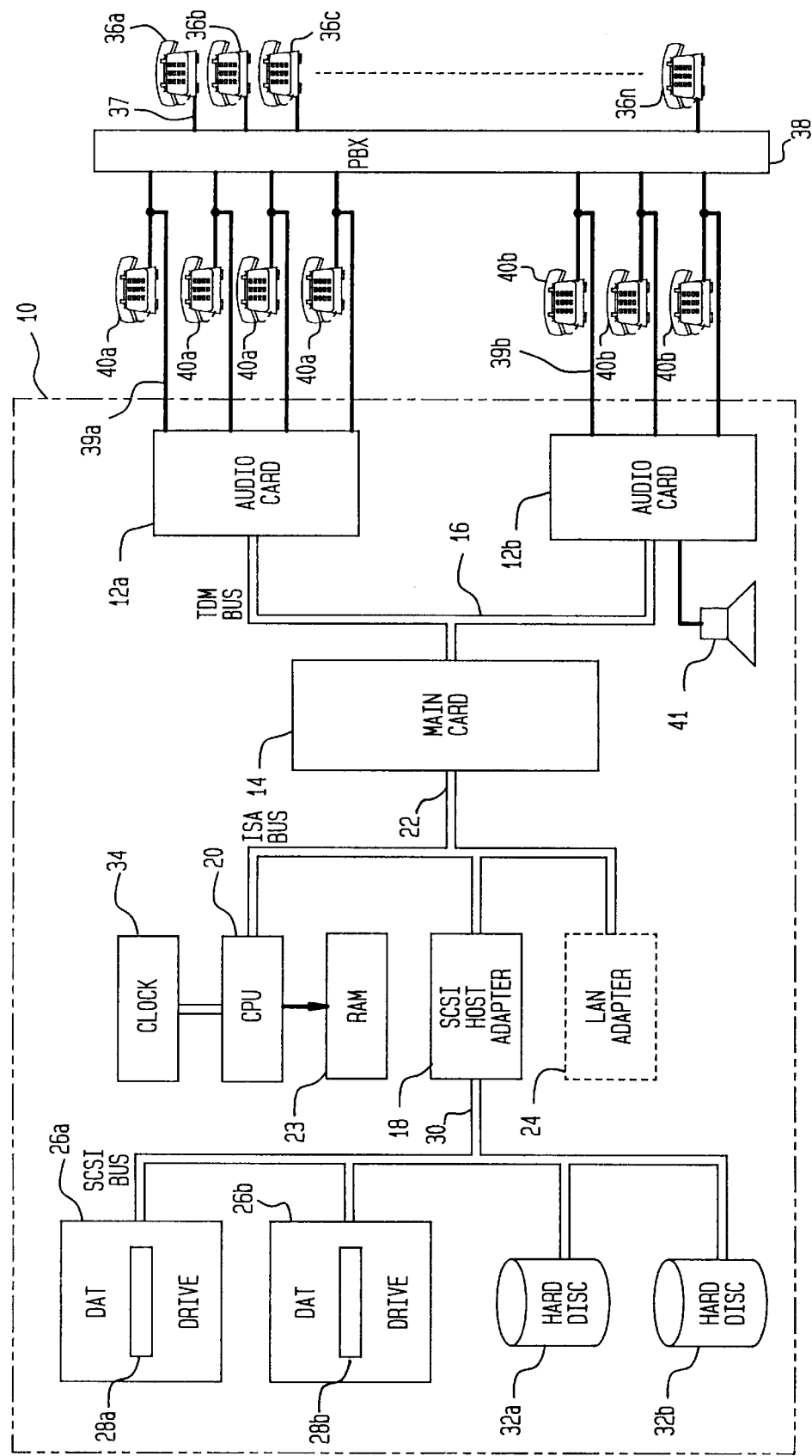
FIG. 1 shows a functional block diagram of a modular digital recording logger constructed in accordance with the present invention.

With reference to FIG. 1, a digital modular recording logger is shown at 10 and includes a pair of audio circuit boards 12a, 12b which will hereinafter be referred to as audio cards. Only two audio cards 12 are shown, but a larger number of audio cards can be included in the system. For example, where thirty two recording channels are required, eight digital audio cards 12 would be required, as it will be described in the description that follows. The audio cards 12a, 12b are in communication with an audio application processing circuit board 14, which hereinafter will be referred to as the main card, through a time division multiplexed (TDM) bus 16. Once more, only one main card 14 is shown and described, but it will be appreciated that where more audio cards are required, (e.g., eight), more main cards also may be needed, (e.g., four), upon the particular architecture of the audio cards and main cards. The main card 14 communicates with a personal computer through an ISA bus 22. The computer has a CPU and RAM 23 and is in communication with a small computer system interface (SCSI) adaptor 18 through the ISA bus 22. The SCSI host adaptor 18 can be any of a number of commercially available adaptors such as an Adapdec 1542 adaptor available from Adapdec Corporation.

The combination of the CPU 20 and RAM 23 can be any personal computer such as an IEE 996 standard PC/AT.

Also tied to the CPU 20 is a clock 34. The LAN adapter 24 provides the opportunity for network connection, as it will be described hereinafter with reference to FIG. 3.

The SCSI host adaptor 18 communicates with a pair of tape drives 26a, 26b each of which is capable of driving a digital audio tape (DAT) 28a, 28b, respectively. The tape drives 26a, 26b are in communication with the SCSI host adaptor 18 through a SCSI bus 30. Also in communication with the SCSI host adaptor 18 through the SCSI bus 30 are two disc drives 32a, 32b. The number of DAT's 28 and disc drives 26 can vary to customize the system 10 to the operative channel requirements, but where the tapes are redundant, only one disc drive need be used.

A plurality of audio sources such as telephones 36a, 36b, 36c . . . 36n are shown. These represent any telephones outside of the system 10 that are able to communicate with the system 10 through communication lines 37. The system 10 can monitor a number of different types of audio devices, including a private branch exchange (PBX) 38 to which a plurality of telephones 40a and 40b are connected. Other audio sources include radio, central office lines, microphones, speakers and the like.

As shown in FIG. 1, the audio card 12a has four ports and is able to communicate with the lines 39 (channels) connecting the telephones 40a with the PBX 38 so as to receive audio signals therefrom. More specifically, the audio cards 12a, 12b receive audio from two sources, an internal telephone 40 and an external telephone 36. The audio card 12b also has four ports, with three of the ports communicating with communication lines 39b leading to telephones 40b and the PBX 38. One of the ports is connected to a speaker 41, thereby allowing messages to be heard, as it will be described hereinafter. The communication lines 39 transmit audio from the PBX 38 and telephones 40 to the audio cards 12.

The audio cards 12 can be of the type shown and described in co-pending patent application Ser. No. 07/815,205 and entitled Audio Circuit Board for a Modular Digital Voice Processing system, filed Dec. 31, 1991, now Ser. No. 102,678, filed Aug. 5, 1993, the disclosure of which is hereby incorporated by reference. The system 10 can be activated in one of two ways, either through the audio card detecting a telephone 40 going off hook, or through a VOX operation controlled by the main card 14 which is activated upon the main card receiving an audio signal from one of the audio cards.

The audio card 12 converts the analog signals received from the communication lines 39 from analog to digital and will transmit the signals onto the TDM bus 16 under control of the main card 14. The main card 14 monitors the status of the audio cards 12a, 12b to see which audio card needs service and upon responding thereto, the audio is sent over the TDM bus 16. The main card 14 can be of the type shown and described in copending application Ser. No. 07/816,404, filed Dec. 31, 1991, now U.S. Pat. No. 5,404,455, and entitled Time Division Multiplexer Chip, the disclosure of which is hereby incorporated by reference. As stated previously, only two audio cards 12 are shown in FIG. 1, but more audio cards can be added to the system as required.

The main card 14 receives the digital audio signals from the audio cards 12 and compresses the data, as for example from 64K bits per second to 13K bits per second of audio and packages the audio into 2048 byte messages. This data is then sent across the ISA bus 22 to the CPU 20 that serves as a traffic director for the entire system 10. The data is stored in the RAM 23 prior to being transmitted to SCSI host adapter 18 and onto the the tapes 28 and discs 32 where the data is stored permanently.

Because DAT recording is relatively fast compared to channel data rates i.e., the DATs are capable of receiving data faster than data is digitized by the system, the data is first written into and stored on the RAM 23 and will be transmitted to the DATs 28 at a rate that is compatible with the capability of the DATs. At the same time, data is written into the disc files 32.

The two tapes 26a, 26b, can be used either independently to achieve greater capacity, or simultaneously to achieve redundancy. When used independently, more data can be written to the tapes. When they are used simultaneously, one tape 28a will serve as a backup for the other tape 28b. In this way, if either of the tapes is destroyed for any reason, there is always a backup.

The disc files 32a and 32b duplicate what is recorded on each of the DATs 28. Clearly, if the DATs 28a, 28b are being used in a redundant manner, only one disc 32 is required to record the audio. In fact, one disc 32 can be partitioned with a portion duplicating the data on one DAT 28a and the other portion duplicating the data on a second DAT 28b when the DATs are run sequentially. The primary function served by the disc file 32 is to allow one to listen to previously written recorded data without interfering with the functions of the DATs 28. In addition, the discs 32a, 32b can serve the function of back-ups for the DATs 28a, 28b.

When one wishes to listen to audio that had been recorded at a particular time, this can be accomplished by inputting a request to the CPU 20 requesting that a message on a particular channel and at the given time be delivered over the speaker 41.

The time data is stored on the DATs 28 and discs 32 under control of the CPU 20. An input is made into the system 10, as by a network or serial port connection for the time and channel for a particular message. The host adaptor 18 will search the disc 32 for the address of the specific time and channel and will retrieve the audio from the disc 32. While this is occurring, the DATs 28a, 28b are capable of continuing to record audio.

The audio recovered from the disc 32a will be transmitted to the main card 14 where decompression will take place and the data will be expanded, as for example, from 13K bits per second to 64K bits per second. The data will then be transmitted to the audio card 12b where it will be converted from digital to analog and eventually will be heard over the speaker 41.

Figure 2:
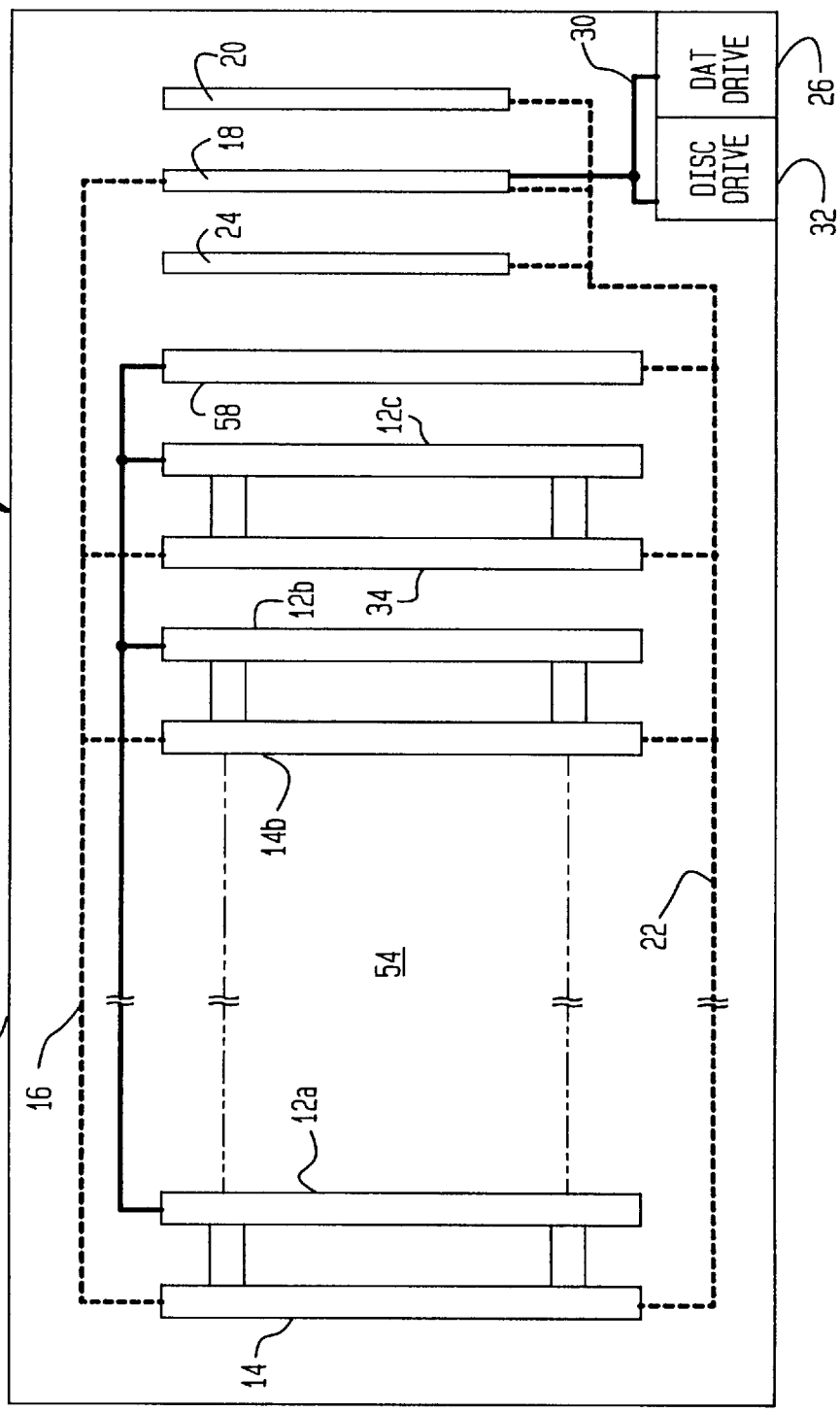
FIG. 2 is a top plan schematic view of the components of the logger of FIG. 1 shown in a housing.

FIG. 2 is a top plan schematic view that demonstrates the modularity of the system 10 and how its capacity can be readily expanded as required. A housing 52 has a base 54 that receives the various cards of the system as will be described. One or more main cards 14a, 14b will be received within and supported by the base 54, as will a plurality of audio cards 12a, 12b. Once more, although three audio cards 12 are shown, it will be appreciated that a greater or lesser number can be used and one main card is capable of monitoring and servicing a plurality of audio cards, two as shown in FIG. 1.

Each main card 14 will be connected logically to an audio card 12a, but it is not necessary that the audio card be connected physically to the main card to which it is connected logically because of the TDM function of the system. In addition, an audio card 12c can be physically attached to a dummy card 34 that can provide an electrical connection but no logic. Thus, one main card 14a can be connected logically through the TDM bus 16 to two audio cards 12a, 12c.

The housing base 54 also supports the CPU 20 which is connected with the main cards 14 through the bus 16. The SCSI adaptor 18 is in communication with the main cards and with the CPU 20 through the ISA bus 22. In this way, cards 12a, 14 can be added or eliminated from the system 10 in accordance with requirements thereof because of the time division multiplexing capability of the system. As a main card 14 and audio card 12 are added they will be connected to the appropriate busses and supported by the base 54. The base 54 also supports a clock buffer 58 that provides timing for the TDM bus and provides additional drive for the ISA bus and the components attached thereto.

Figure 3:
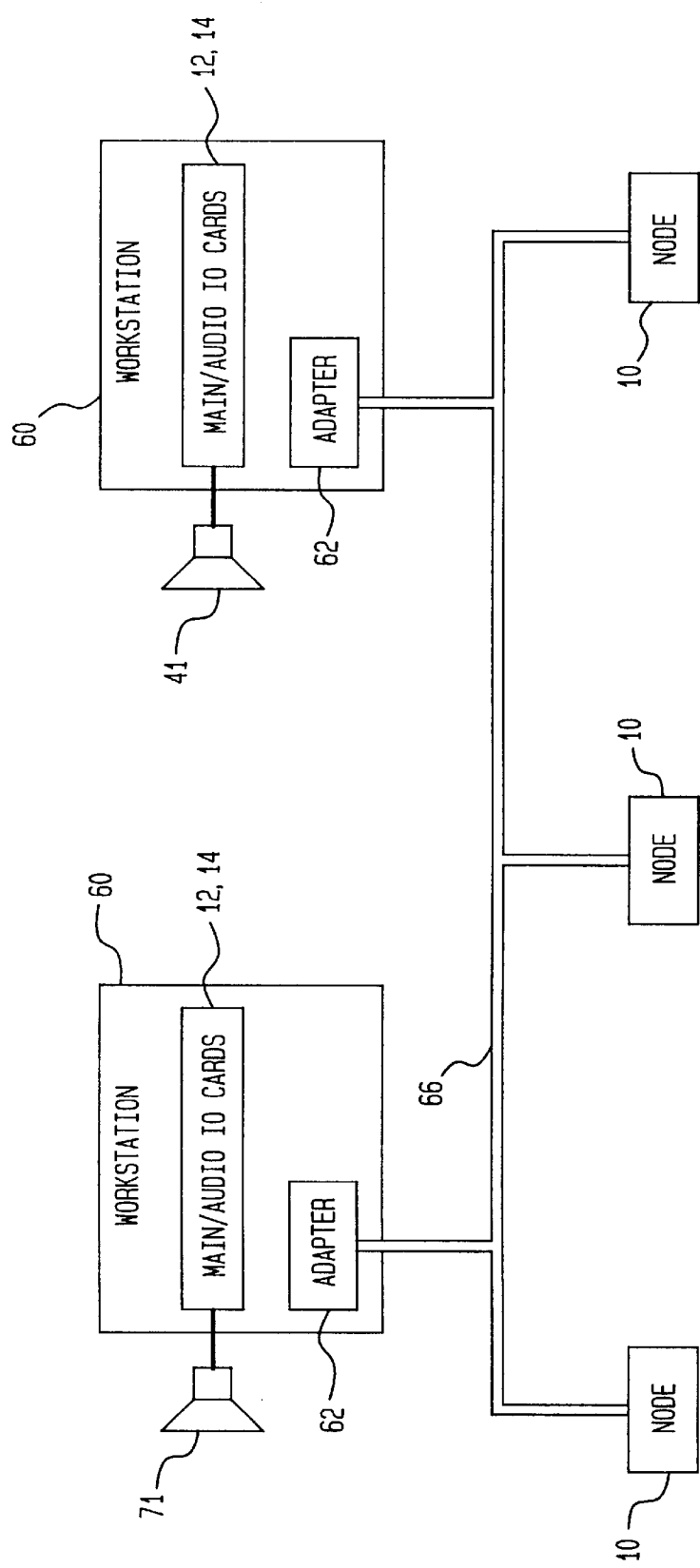
FIG. 3 is a block diagram showing a plurality of the loggers of FIG. 1 connected in a network.

FIG. 3 is a schematic view showing how the invention can be networked to include a number of systems 10 connected as nodes, and workstations 60. Where a large number of telephone conversations are to take place and recorded, as for an example at a brokerage firm, a large number (e.g. 160) of conversations may need to be recorded. In this instance, one system 10 would not be capable of servicing that many calls.

In FIG. 3, several workstations 60 are connected to a LAN bus 64 and are several of nodes 10. Each workstation is a personal computer 60 with a main card 14, an audio card 12 and a LAN adapter 62. A speaker 41 is attached to each workstation 60. In addition, the number of workstations 60 can be increased so that access to the systems 10 at a number of different locations can be achieved and one would be able to monitor and have access to any audio data as required.

When audio is to be retrieved, the processing will take place in a node 10 as described previously, with the exception that compressed audio is sent by the LAN adapter 24 (FIG. 1) over the LAN bus 64 (FIG. 3) and received by the LAN adapter 62 of the requesting workstation 60. The compressed data is then processed by the main/audio cards, 14, 12 and subsequently audio is heard over the speaker 41.

Thus, what has been shown and described is a digital recording logger that is modular in construction, is capable of using digital audio tapes in an effective manner and can be networked to provide a plurality of workstations and nodes.

The above embodiments have been given by way of illustration only, and other embodiments of the invention will be apparent to those skilled in the art from consideration of the detailed description. Accordingly, limitations on the instant invention are to be found only in the claims.

What is claimed is:

1. A modular digital recording logger, comprising:
    a housing;
    at least two circuit modules in said housing for converting analog voice signals to digital voice signals, each of said circuit modules including at least two terminals for receiving said analog voice signals, each of said terminals being capable of receiving said analog voice signals for recording a two-way conversation;
    a circuit in said housing for compressing said digital voice signals received from each of said circuit modules to provide compressed voice data;
    a first bus in said housing for providing communication between said circuit module and said compressing circuit;
    a multiplexer circuit in said housing for providing communication between said compressing circuit and said first bus, wherein said multiplexer circuit multiplexes voice signals exchanged between said compressing circuit and said circuit modules on said first bus; and
    a digital audio tape (DAT) drive for storing said compressed voice data.

2. The modular digital recording logger of claim 1, further including a clock in communication with said computer.

3. The modular digital recording logger of claim 1, further including a speaker in communication with at least one circuit module.

4. The modular digital recording logger of claim 1, further comprising a hard disk drive in said housing for storing and reproducing said compressed voice data.

5. The modular digital recording logger of claim 4, further comprising: a computer in said housing for operating said DAT drive and/or said hard disk drive to store and reproduce said digital voice signals; and
    a second bus in said housing for connecting said computer to said hard disk drive and said DAT drive.

6. The modular digital recording logger of claim 1, wherein said first bus is a time division multiplexing (TDM) bus and said multiplexer circuit is a time division multiplexer circuit.

7. The modular digital recording logger of claim 1, wherein said second bus is a small computer system interface (SCSI) bus and further comprising a SCSI adapter for connecting said computer to said SCSI bus.

8. The modular digital recording logger of claim 1, wherein said compressing circuit is a processor.

9. The modular digital recording logger of claim 8, further comprising an ISA bus for providing communication between said computer and said processor.

10. The modular digital recording logger of claim 7, further including a random access memory (RAM) for storing said compressed voice data before it is transmitted to the SCSI adapter.

11. A network system of modular digital recording loggers, comprising:
    at least two digital recording loggers for logging voice conversations, each of said recording loggers comprising:
        a housing;
        a circuit in said housing for converting analog voice signals to and from digital voice signals, said circuit modules including at least two terminals for receiving said analog voice signals, and wherein each of said terminals is capable of receiving said analog voice signals for recording a two-way conversation,
        a circuit in said housing for compressing said digital voice signals received from each of said circuit modules to provide compressed voice data,
        a first bus in said housing for providing communication between said circuit module and said compressing circuit,
        a multiplexer circuit in said housing for providing communication between said compressing circuit and said first bus, wherein said multiplexer circuit multiplexes voice signals exchanged between said compressing circuit and said circuit modules on said first bus,
        a digital audio tape (DAT) drive for storing said compressed voice data,
        a hard disk drive in said housing for storing and reproducing said compressed voice data,
        a first computer in said housing for operating said DAT drive and/or said hard disk drive to store and reproduce said digital voice signals, and
        a second bus in said housing for connecting said computer to said hard disk drive and said DAT drive;
    a second computer for processing compressed digital voice signals received from each of said recording loggers; and
    a third bus connecting each of said recording loggers to said second computer.

12. The network system of claim 11, further comprising a clock in communication with said first computer.

13. The network system of claim 11, wherein said third bus is a local area network (LAN) bus.

14. The network system of claim 13, wherein said second computer and each of said recording loggers further include a LAN adapter for providing connection to said LAN bus.

15. The network system of claim 11, wherein said first bus is a time division multiplexed (TDM) bus and said multiplexer circuit is a time division multiplexer circuit.

16. The network system of claim 11, wherein said second bus is a small computer system interface (SCSI) bus and further comprising a SCSI adapter for connecting said first computer to said SCSI bus.

17. The network system of claim 16, further comprising a random access memory (RAM) for storing said compressed voice data before it is transmitted to the SCSI adapter.

18. The network system of claim 11, wherein said compressing circuit is a processor.

19. The network system of claim 18, further comprising an ISA bus for providing communication between said first computer and said processor.

20. The network system of claim 11, wherein said second computer is a workstation.

21. The network system of claim 11, further comprising a speaker in communication with said second computer for reproducing said analog voice signals.

22. A method of manufacturing a modular digital recording logger, comprising the steps of:
    selecting a number of circuit modules for converting analog voice signals to and from digital voice signals, each of said circuit modules including at least two terminals for receiving said analog voice signals, and wherein each of said terminals is capable of receiving said analog voice signals for recording a two-way conversation;

installing said selected number of said circuit modules in a housing;

installing a circuit in said housing for compressing said digital voice signals received from each of said circuit modules to provide compressed voice data;

installing a first bus in said housing for providing communication between said circuit module and said compressing circuit;

installing a multiplexer circuit in said housing for providing communication between said compressing circuit and said first bus, wherein said multiplexer circuit multiplexes voice signals exchanged between said compressing circuit and said circuit modules on said first bus; and installing a digital audio tape (DAT) drive in said housing for storing and reproducing said compressed voice data.

23. The method of claim 22, further comprising the steps of connecting to said comprising circuit a hard disk drive for storing and reproducing said compressed voice data.

24. A method of networking a plurality of digital recording loggers, comprising the step of:

selecting a number of modular digital recording loggers for logging voice conversations, each of said recording loggers comprising:

a housing;

a circuit in said housing for converting analog voice signals to and from digital voice signals, said circuit including a plurality of terminals for receiving said analog voice signals, and wherein each of said terminals is capable of receiving said analog voice signals for recording a two-way conversation, a circuit in said housing for compressing said digital voice signals received from each of said circuit modules to provide compressed voice data, a first bus in said housing for providing communication between said circuit module and said compressing circuit, a multiplexer circuit in said housing for providing communication between said processor and said first bus, wherein said multiplexer circuit multiplexes voice signals exchanged between said compressing circuit and said circuit modules on said first bus, a digital audio tape (DAT) drive for storing and reproducing said compressed voice data, a hard disk drive for storing and reproducing said compressed voice data, a first computer in said housing for operating said DAT drive and/or said hard disk drive to store and reproduce said digital voice signals, and a second bus in said housing for connecting said computer to said hard disk drive and said DAT drive;

installing said selected number of said recording loggers;

installing a second computer for processing compressed digital voice signals received from each of said recording loggers; and installing a third bus connecting each of said recording loggers to said second computer.

25. The method of claim 24, wherein said third bus is a local area network (LAN) bus.

26. The method of claim 25, wherein said second computer and each of said recording loggers further include a LAN adapter for providing connection to said LAN bus.

* * * * *